United States Patent [19]

Geringer et al.

[11] Patent Number: 5,335,750
[45] Date of Patent: Aug. 9, 1994

[54] DUAL MODE TRANSMISSION CONTROL

[75] Inventors: Kerry G. Geringer; Harlos L. Barnum; Lon A. Jennings, all of Ames, Iowa

[73] Assignee: Sauer Inc., Ames, Iowa

[21] Appl. No.: 897,272

[22] Filed: Jun. 11, 1992

[51] Int. Cl.$^5$ .............................................. B60K 17/00
[52] U.S. Cl. ...................................... 180/307; 60/433
[58] Field of Search ....................... 180/305, 306, 307; 60/433, 434

[56] References Cited

U.S. PATENT DOCUMENTS

| | | | |
|---|---|---|---|
| 3,187,497 | 6/1965 | Granryd | 60/422 |
| 3,508,401 | 4/1970 | Aplin | 60/389 |
| 3,603,084 | 9/1971 | Okazaki | 60/389 |
| 4,191,270 | 3/1980 | Monteith | 180/53.4 |
| 4,528,871 | 7/1985 | Nembach | 74/733.1 |
| 4,530,416 | 7/1985 | Kassai | 180/307 |
| 4,553,626 | 11/1985 | Kazmierczak et al. | 180/307 |
| 4,554,992 | 11/1985 | Kassai | 180/307 |
| 5,056,615 | 10/1991 | Duthie et al. | 180/306 |

*Primary Examiner*—Johnny D. Cherry
*Assistant Examiner*—Andrew C. Pike
*Attorney, Agent, or Firm*—Zarley, McKee, Thomte, Voorhees & Sease

[57] ABSTRACT

A street sweeping vehicle has a chassis supported on travel wheel units. An engine and an operator control compartment are on the chassis. A single hydrostatic transmission is on the chassis and is operatively connected to the engine and travel wheel units. An accelerator pedal located in the compartment is connected to the engine to vary its operating speed. An electronic and hydraulic control system accessible in the control compartment are connected to the transmission to control it and coordinate the operation of the engine and travel wheel units. The control system has a travel mode responsive to engine speed and a work mode independent of engine speed with control components to coordinate the modes and to permit the dual or separate operation thereof. The transmission has a variable displacement hydraulic pump and at least one hydraulic motor, with the control system operatively connected to each. The control compartment has equivalently equipped laterally positioned operator command stations, making the vehicle selectively operable from either of the two stations. The control system includes a brake defeat valve, an antistall switch, a phase control for phasing pump and motor displacements to achieve higher speeds, a valve for compensating for system pressure, and a electromechanical FNR switch for preventing a change between the travel and work modes unless the pump is in neutral.

10 Claims, 8 Drawing Sheets

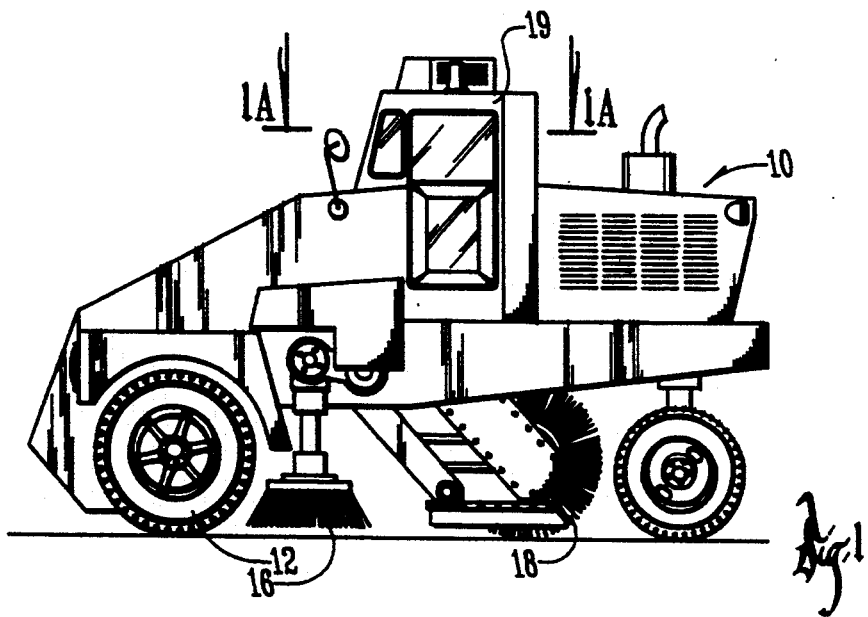
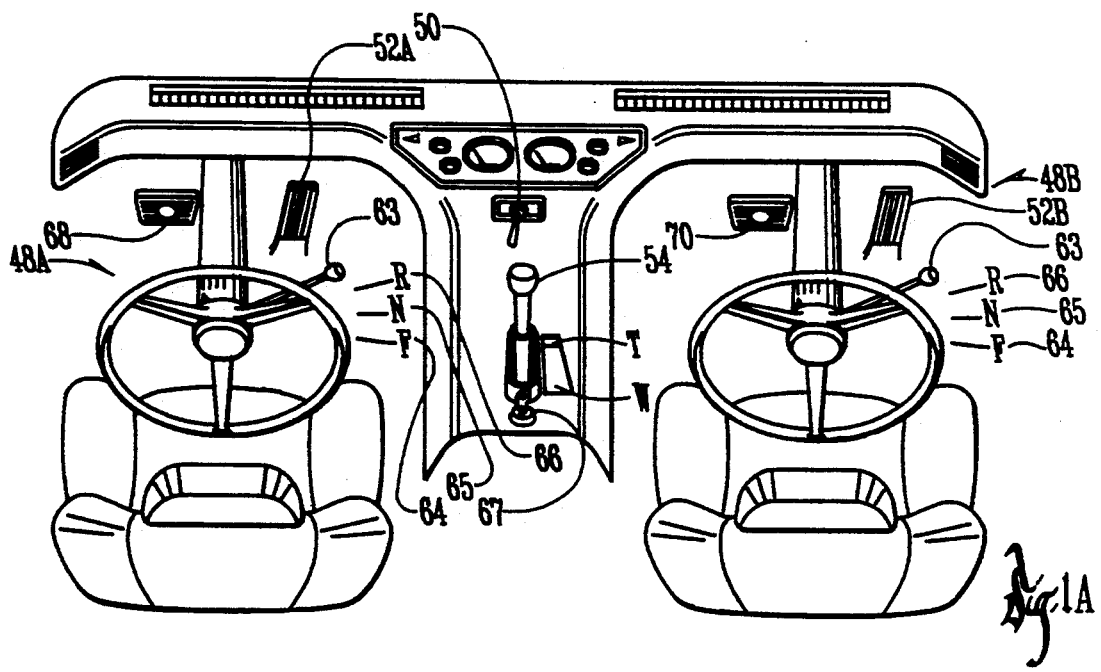

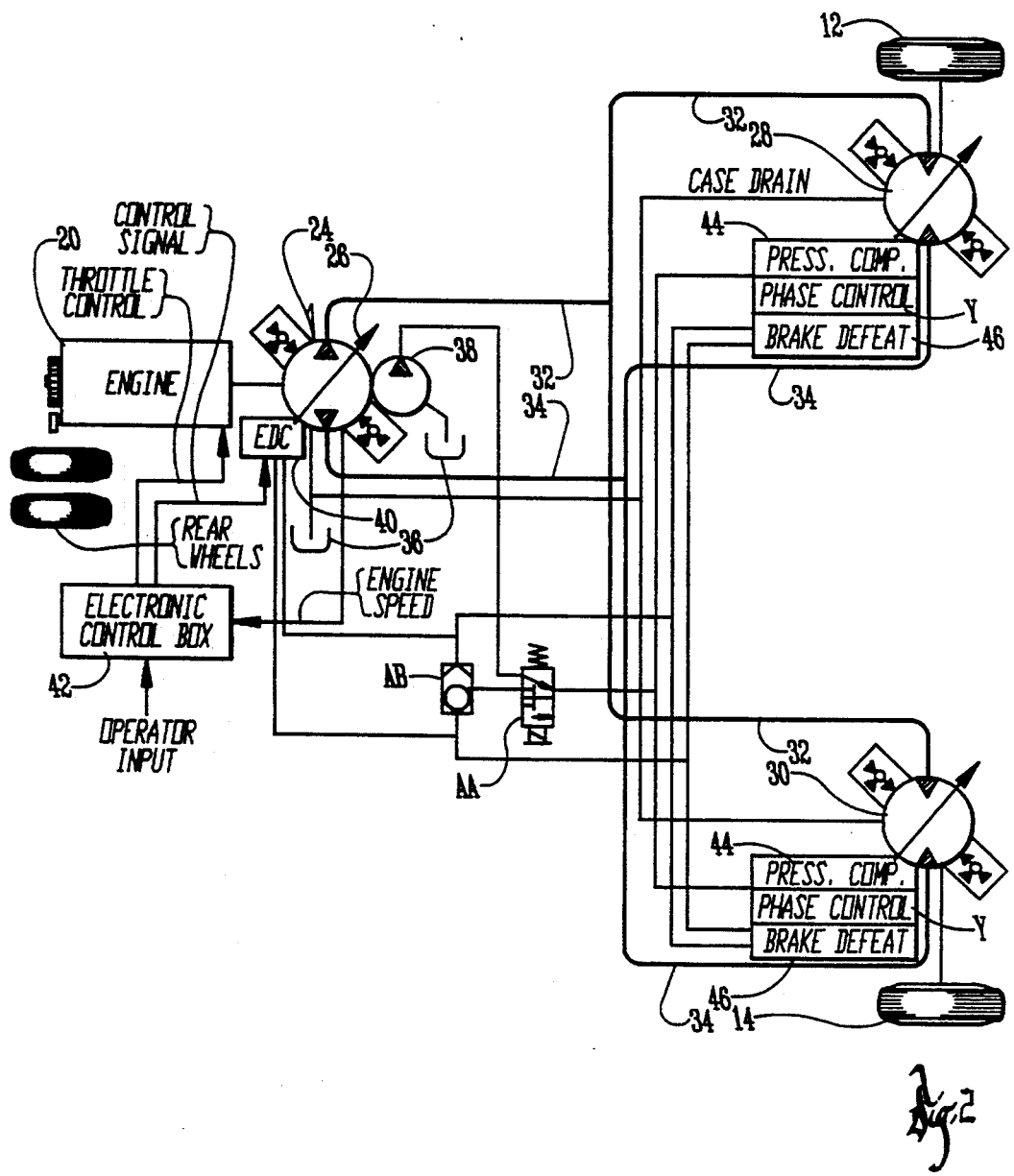

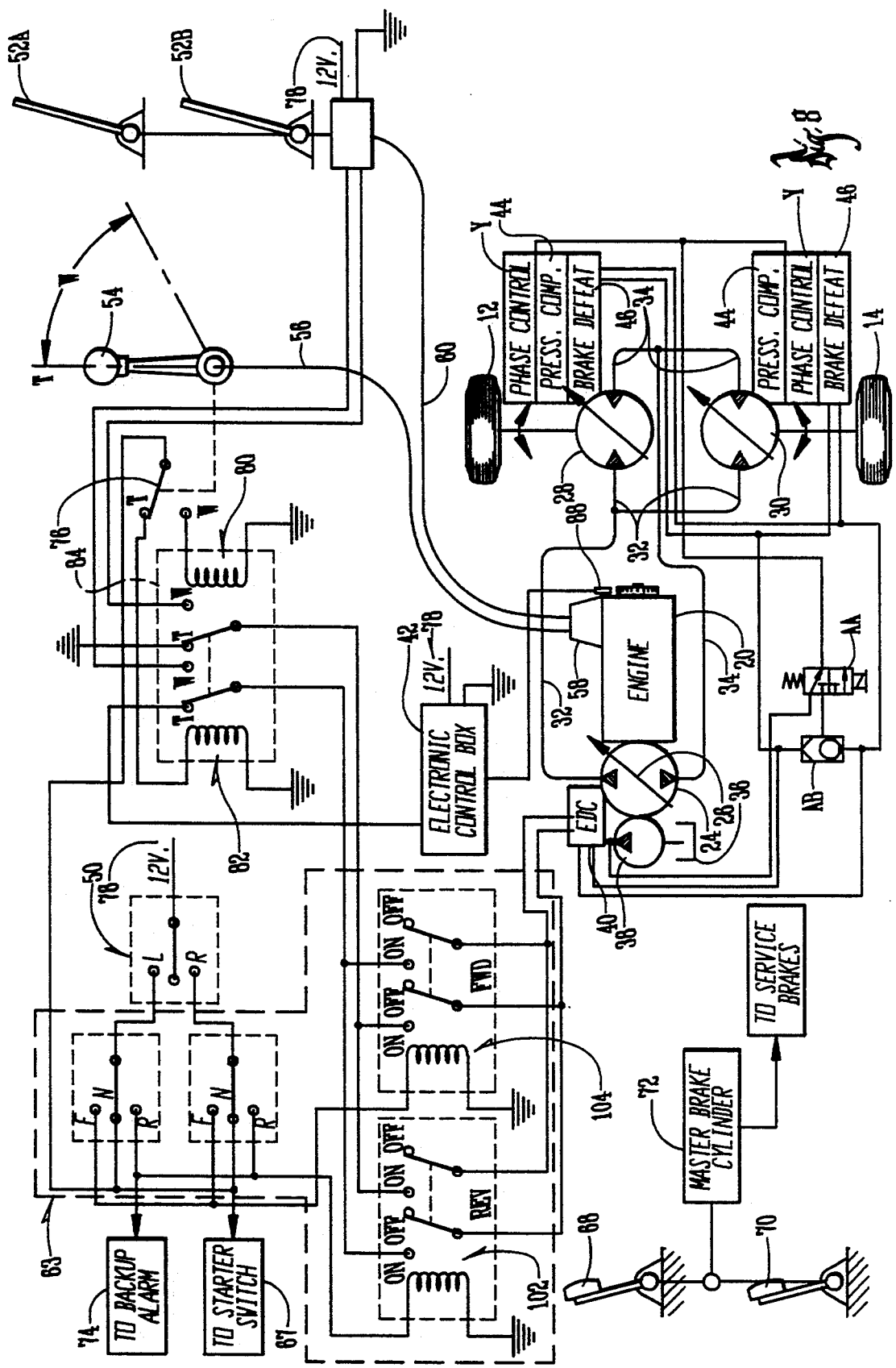

DUAL MODE TRANSMISSION CONTROL

BACKGROUND OF THE INVENTION

This invention relates to controls for a variable displacement hydrostatic transmission, hereinafter designated "HST".

HSTs are known to be useful for propelling many types of vehicles. They consist of at least one pump and may include a plurality of motors. However, a persistent problem is that two distinct modes of operation are often desired by the operator. In the first mode, the operator desires to utilize the variable speed capability of the hydrostatic transmission, at a relatively constant engine speed, to perform a work function. In this mode, the relatively low vehicle speed is a function of the engine speed, a constant, and the variable displacements of the components of the hydrostatic transmission. In the second mode, the operator desires to utilize the HST for travel by propelling the vehicle at a speed proportional to engine speed. Typically, much higher speeds are desired in the travel mode then the work mode. Automotive-style control, where engine speed and vehicle speed can be proportionally affected by an accelerator foot pedal, is often desired in the travel mode.

To provide a travel mode and work mode, vehicle designers have sometimes been forced to use separate transmissions for each mode. Such redundancy is both costly and inefficient. The street sweeper of U.S. Pat. No. 4,553,626 discloses an attempt to use the same HST for both modes by linking an inching valve with a selector lever, throttle, and governor. This results in an accelerator-controlled travel mode and a governor-controlled work mode. U.S. Pat. No. 4,554,992 discloses a four wheel street sweeper which uses a HST controlled by an inching valve and an automatic metering speed control valve to give high and low speed operation. U.S. Pat. No. 5,056,615 discloses a speed control which results in separate modes for travel and an auxiliary drive for vehicles such as street sweepers.

SUMMARY OF THE INVENTION

In some vehicles, such as street sweepers, identical operator command stations on either side of the vehicle are also desirable so that the operator may have a better view of the curb.

Accordingly, a primary objective of the present invention is to provide a means of control for a HST in a vehicle which can command dual, independent travel (high vehicle speed) and work (low vehicle speed) modes utilizing a variable pump and one or more motors.

Another objective of the present invention is to provide a means of control for a vehicle with an HST that can receive commands from more than one operator command station. Left and right command stations may be appropriate in many vehicles.

Another objective of the present invention is to provide a stable means of control for a vehicle with an HST that defeats abnormal hydrostatic braking in the travel mode.

Another objective of the present invention is to provide a means of control for a vehicle with an HST that allows for pressure compensation of the variable motor to increase motor displacement when system pressure exceeds predetermined limits.

Another objective of the present invention is to provide a means of control for a vehicle with an HST where reduction of variable motor displacement is phased with pump displacement to achieve higher vehicle speeds.

Another objective of the present invention is to provide a means of control for a vehicle with an HST that has a safety lock-out feature which prevents the vehicle from being started unless the pump is in neutral and the throttle lever in a specific position.

Another objective of the present invention is to provide a means of control for a vehicle with an HST that will not allow a change of mode unless the variable pump is in neutral.

Another objective of the present invention is to provide, in the travel mode, a means of control for a vehicle with HST that leaves the operator with the perception of smooth acceleration similar to driving a car with an automatic transmission.

Another objective of the present invention is to provide a means of control for a vehicle with an HST that destrokes the variable pump to prevent stalling of the vehicle engine when travelling up a hill faster than available engine horsepower will allow.

Another objective of the present invention is to prevent mode changes that would result in unsafe operating conditions in a vehicle equipped with a multiple mode control system for hydrostatic drive.

Another objective of the present invention is to provide a control system for a HST drive in a vehicle that allows for convenient and safe vehicle operation.

These and other objectives will be apparent to those skilled in the art.

The invention involves a wheeled vehicle having a hydrostatic drive mechanism, and working components normally operated while the vehicle is moving. The invention permits a single group of controls to derive two different hydrostatic transmission functions from the same pump and motor combination. First, the transmission will operate in a constant engine speed mode, where the vehicle speed is a result of constant engine speed and variable pump/motor displacements. The work mode is defined as the constant engine speed condition of the vehicle, the reason being that, typically the engine speed on a vehicle is directly linked to the useful functions that the machine performs and those functions are expected to happen at a closely defined rate. The motors are phased with the pump to achieve higher speed in the work mode.

The invention further provides a second function which is a travel mode, where the displacement of the pump will be a result of variable engine speed read by an electronic control means. The automotive control design is used for the travel mode because it allows the operator a transport mode where travel speed is proportional to engine RPM. The motors are pressure compensated to achieve the high travel speeds and acceptable acceleration.

The vehicle has a chassis which is supported by travel wheel units. An engine is on the chassis as is an operator control compartment. The vehicle has auxiliary work components such as street sweeping elements. A single hydrostatic transmission is on the chassis and is operatively connected to the engine, the travel wheel units, and the work components. An accelerator pedal is located in the control compartment and is connected to the engine to vary the operating speed thereof.

Electronic and hydraulic control means accessible in the control compartment are connected to the hydrostatic transmission to control the hydrostatic transmission and to coordinate the operation of the engine, the travel wheel units, and the work components. The control means has a travel mode and a work mode with control components to coordinate the modes and to permit the dual or separate operation thereof.

The hydrostatic transmission has a variable hydraulic pump and at least one hydraulic motor, with the control means operatively connected to each.

The control compartment has two equivalently equipped laterally positioned operator command stations so that the vehicle can be operated from either of the command stations.

The control components act in conjunction with the motor to defeat hydrostatic braking of the vehicle when the vehicle is in its travel mode. The control components act to phase the pump and motor displacements or to compensate for system pressure. Finally, the control components act to prevent a change between the travel and work modes unless the pump is in a neutral position.

BRIEF DESCRIPTION OF THE DRAWINGS

FIG. 1 is a side view of a street sweeping machine to which the present invention may be applied.

FIG. 1A is a sectional view taken along line 2—2 of FIG. 1 showing the two operator command stations of the vehicle;

FIG. 2 is a schematic plan view showing the dual mode control wheel drive configuration;

FIGS. 3 and 4 are connected and constitute the total hydraulic system of the HST;

FIG. 8 is a schematic view showing the control system for both the electrical and hydraulic components.

DETAILED DESCRIPTION OF THE INVENTION

Figure 3:
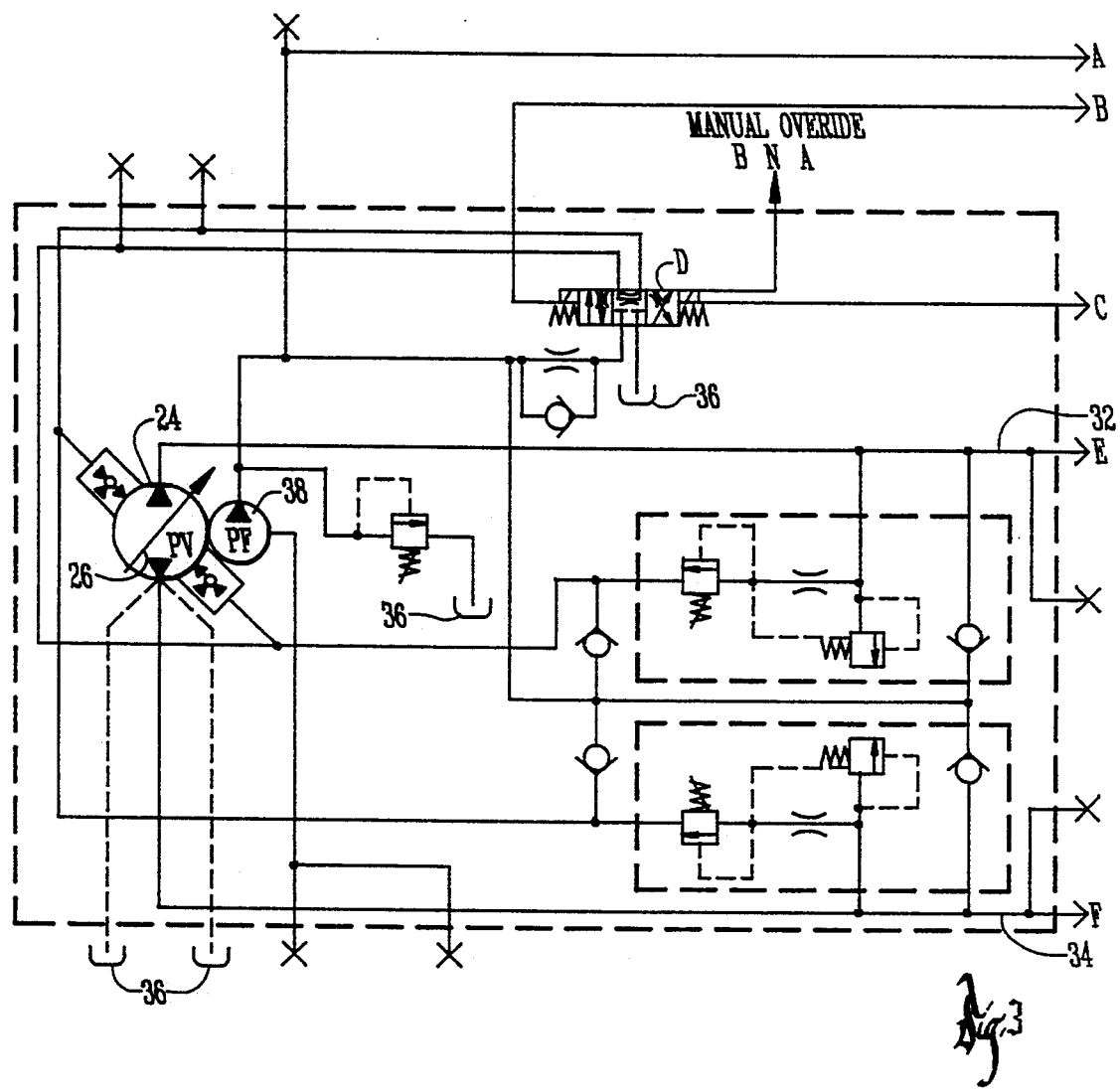
FIG. 3 is a schematic drawing of the pump hydraulic system.

A vehicle, exemplified by but not limited to the street sweeper 10 in FIG. 1, has need of power to its wheels 12 and 14 for propulsion and need of power at constant engine speed to work auxiliary functions such as sweepers 16 and 18. As shown in FIG. 2, the power source for vehicle 10 is an engine 20 of conventional construction. Power from engine 20 is transmitted to wheels 12 and 14 a hydrostatic transmission.

The hydrostatic transmission (HST) is made up of one or more variable displacement pumps 24 (hereinafter PV), having a shaft which is coupled to the shaft of the engine, and one or more variable displacement motors 28 and 30 (hereinafter MV). For a typical HST using motors, pumps and swashplates, see U.S. Pat. No. 4,903,545. MVs 28 and 30 typically correspond one to each drive wheel 12 and 14 respectively.

The PV 24 is generally of a conventional construction wherein a plurality of movable pistons are mounted within a rotatable cylinder block and are caused to stroke axially of the cylinder block by means of a swashplate 26, shown symbolically in FIG. 8. The position of the swashplate can be varied about a rotational axis to vary the stroke of the pistons and, thus, the displacement of the PV. The MVs 28 and 30 of FIG. 8 are similar to the PV 24 in construction and manner of varying displacement. PV 24 and MV 28 and 30 are connected in a closed loop circuit through a pair of hydraulic lines 32 and 34. ( FIG. 8 ) . Oil that leaks internally out of the pump and motors returns to reservoir 36 through case drains (not shown). A fixed charge pump 38 provides make-up oil from the reservoir to replenish the loop.

PV 24 is equipped with an electrical displacement control 40 (hereinafter EDC) so it is capable of interfacing with the electronics control box 42 (hereinafter ECB) described in detail below. EDC 40 is supplied with charge pressure by charge pump 38 and is connected to the phase control means 44 and brake defeat means 46 through lines 32 and 34 which run between PV 24 and MV 28 and 30. (FIG. 8).

The interior of cab 19 of the street sweeper is shown in FIG. 1A. As shown in FIG. 1A, the operator can select between equally equipped left or right command stations 48A and 48B by shifting command station selector switch 50 to either side.

The present invention gives the operator two mutually exclusive means of affecting the speed of engine 20. The first is through accelerator foot pedal 52A or 52B. (FIG. 8). The second is through throttle lever 54. As shown in FIG. 8, throttle lever 54 is electrically connected by line 56 to electronic governor 58, and thus provides a command for the electronic governor 58 to control engine speed. Throttle lever 54 also provides automatic selection of work or travel modes by virtue of its position. When throttle lever 54 is set in position T as shown in FIG. 8, the travel mode is selected and engine 20 idles at a constant speed until foot pedal 52A or 52B is depressed by the operator. In the travel mode, foot pedal 52A or 52B, instead of throttle lever 54, is electrically connected to electronic governor 58 through line 60 to command engine speed.

On the steering column or console of each command station shown in FIG. 1A is a Forward-Neutral-Reverse (hereinafter FNR) switch 63 which has forward position 64, neutral position 65, and reverse position 66. Throttle lever 54 and FNR switch 63 assist in providing important safety features in the control system. As shown in FIG. 8, starter switch 67 prevents the engine from being started without FNR switch 63 being in Neutral and throttle lever 54 in the Idle or Travel Mode position. The operator also may not change modes without the FNR switch being in the Neutral position. There are drastic differences in vehicle performance characteristics in the two different modes and such control logic is needed to prevent unsafe mode changes while vehicle is operating. As also shown in FIGS. 1A and 8, brake pedals 68 and 70 are connected to master brake cylinder 72 to provide a means of slowing and stopping the vehicle. A backup alarm 74 (FIG. 8) will sound when the vehicle moves in a reverse direction.

Referring to FIG. 8, the operation of the present invention in its travel mode can be understood. Throttle lever 54 is at its idle or travel position T. Automotive/displacement control mode switch 76 is in contact position T. In this position, current is supplied from 12-volt source 78 to relay 80 causing it to switch to position T. Relay 82 follows the same switching movement. A variable command current is thus able to be supplied from ECB 42, based on engine speed read at pulse pickup sensor (hereinafter PPU) 88, through travel/-work selector relays 84 to electronic displacement control (EDC) 40. EDC 40 positions swashplate 26 in PV 24, to change the displacement of the PV, affect the speed of MV 28 and 30, and therefore the speed of the vehicle.

ECB 42 receives power from 12 volt source 78 and reads a signal representing engine speed from a pulse pickup sensor (PPU) 88 on engine 20.

As shown in FIG. 8, with FNR switch 63 in the neutral position, the operation of the present invention in the work mode is commenced when the throttle lever 54 is displaced from its idle or travel position T to a new position in the work or W range. When displacement control mode switch 76 is moved to contact position w, current is sent to relay 80 switching it to position w. Relay 82 follows the position of relay 80. Position w of relay 82 connects foot pedal 52A or 52B to EDC 40.

In the work mode, the operator maintains constant engine speed at a given throttle setting because throttle lever 54 is electrically connected with electronic governor 58 on engine 20. The operator adjusts vehicle speed and power available for other work by foot pedal commands to change the displacement of PV 24. Based on foot pedal command, EDC 40 adjusts the position of swashplate 26 in PV 24 to maintain vehicle speed and work output as required for a given engine speed.

In both the work and travel modes, current destined for EDC 40 must go through forward-reverse selector relays 102 and 104. If the vehicle is going in forward, these relays will receive current and move their contacts from the "off" position to the "on" position. In the "on" position, forward relays 104 allows current based on pedal position to flow to the EDC. Reverse relays 102 perform the same function when the vehicle is moving in a reverse direction.

Figure 4:
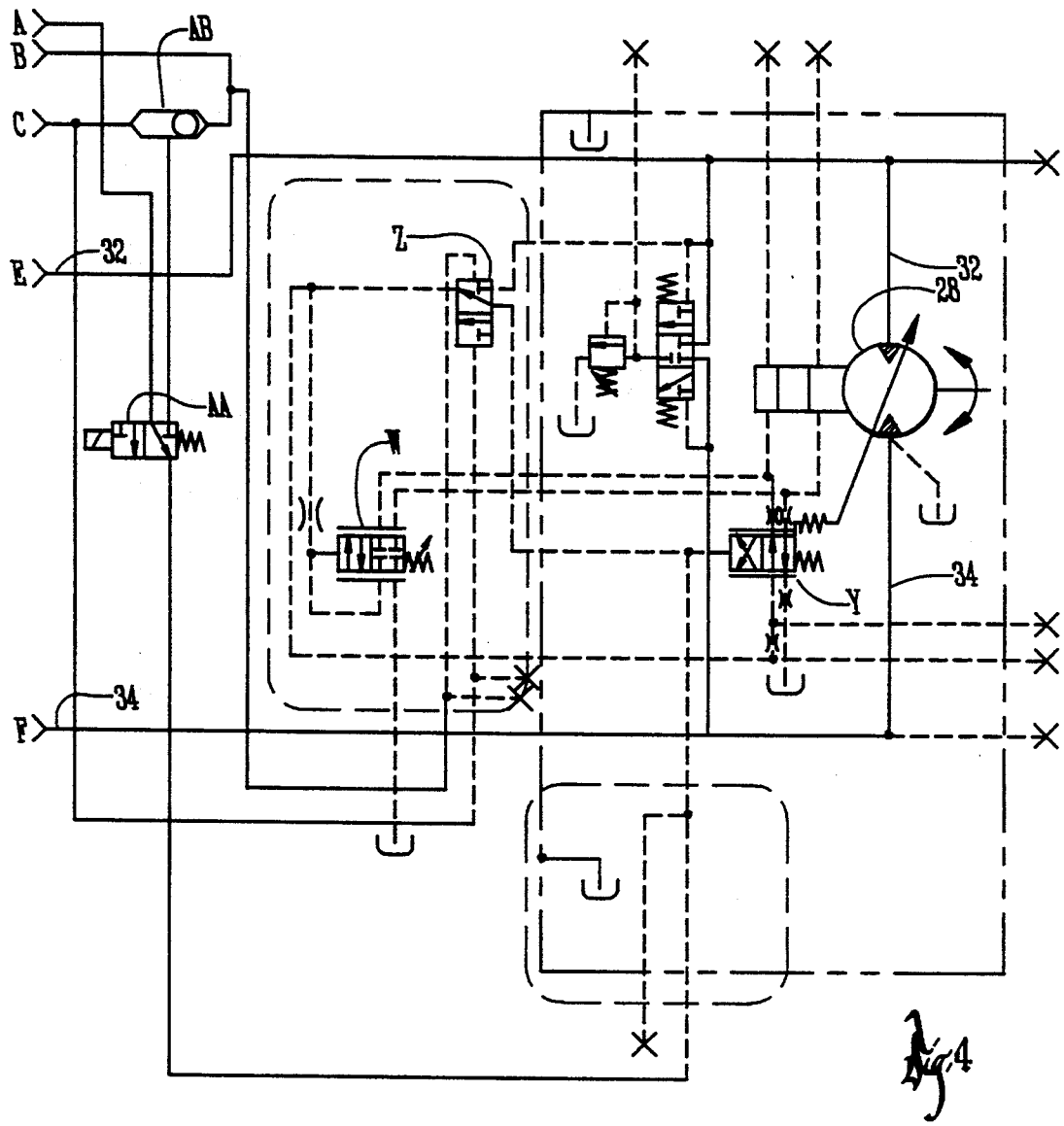
FIG. 4 is a schematic view similar to that of FIG. 3 but shows the motor hydraulic system.
Figure 5:
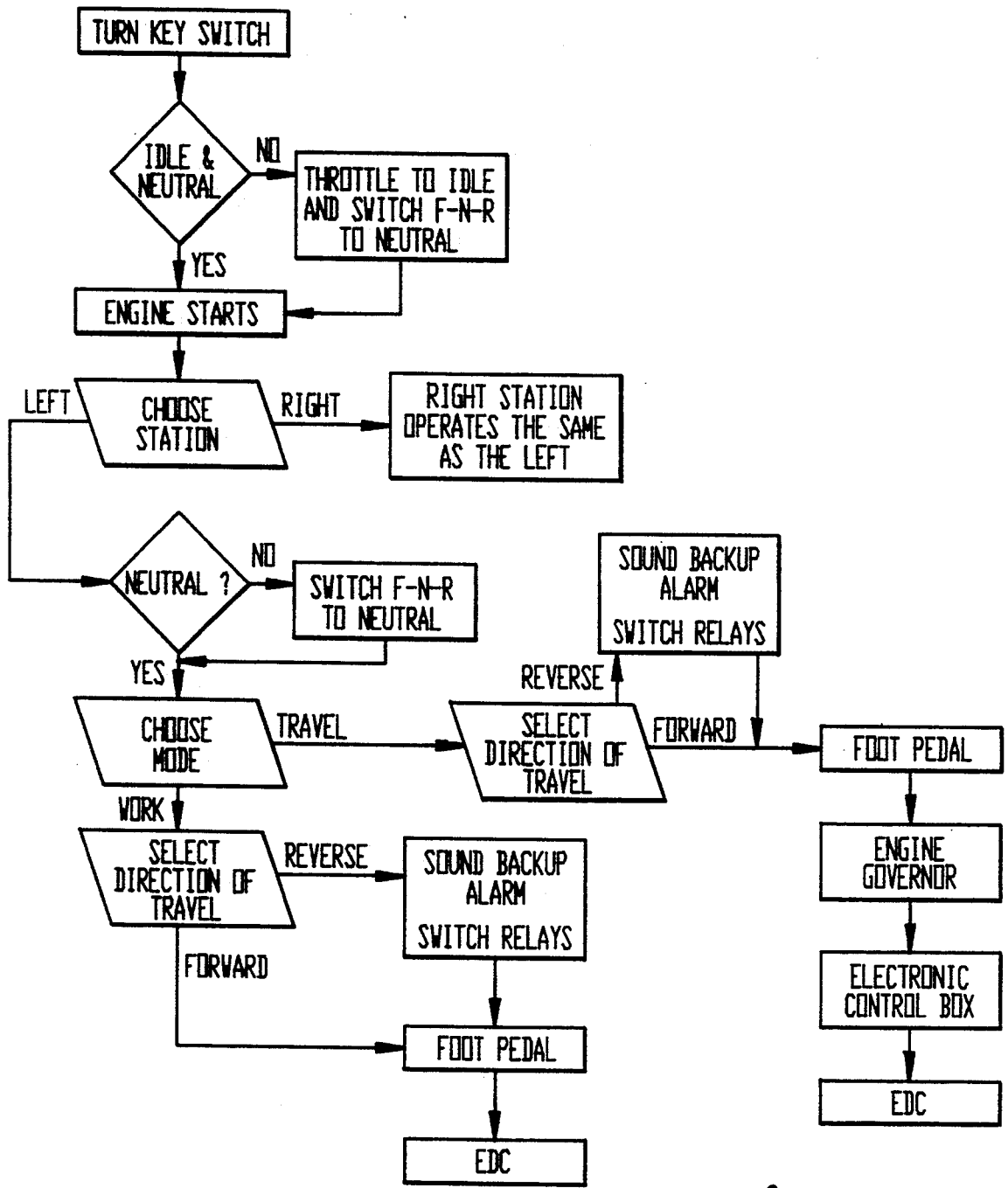
FIG. 5 is a schematic view showing the functional control logic of the dual mode system which shows the flow chart of electrical control logic functions.
Figure 6:
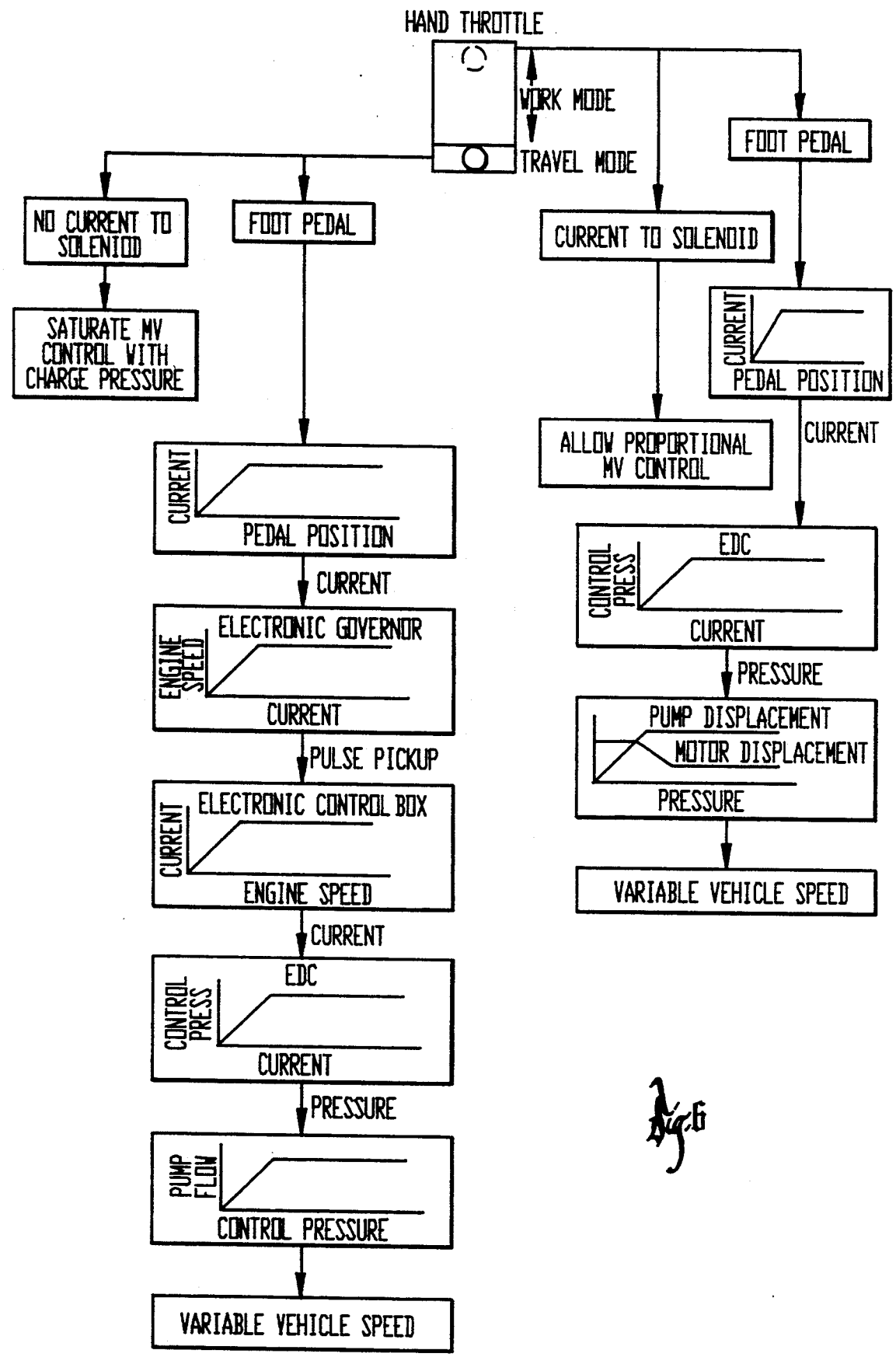
FIG. 6 is a schematic view showing the control interactions of the dual mode control which depicts the flow chart of control functions.

The entire hydrostatic circuit is a closed loop design. In other words, the flow that is sent from the pump 24 to the motors 28 and 30 is returned directly to the pump. The oil that leaks internally out of the pump and motors is returned to the reservoir 36. The flow that is lost from the circuit due to leakage is replaced by the charge pump 38 that is shown on the side of the main pump in FIG. 8. The pump 24 is mounted directly to the rear of the engine. It is equipped with an EDC 40 so that it is capable of interfacing with the ECB 42. The EDC 40 translates electrical signals from the ECB 42 or foot pedals 52A or 52B into hydraulic pressure differentials that control pump and motor displacements. FIGS. 3 and 4 are the hydraulic schematic representations of the pump and motor combination. Only one motor is shown in the schematic; the other is exactly the same. This system could also be applied with multiple pumps and motors.

Reference is made to FIG. 4 which illustrates the constant engine speed (work mode) by moving the throttle lever 54 to an engine speed higher than idle, two position solenoid valve [AA] engages so that a displacement command signal can be supplied by the EDC 40 on the pump 24 to phase control [Y] on the motor. By the nature of the EDC 40, one of the signal ports is high pressure and the other is low. In order to ensure that the high pressure signal is sent to the phase control, resolver [AB] is used to select the highest signal pressure. Thus, a proportional hydraulic signal is sent to each motor (28 and 30). When this signal reaches a pre-defined level, determined by adjustment of the motor control, the motor begins to move from its maximum displacement to some lower displacement. By changing the motor displacement to a lower value, vehicle speed will increase while the flow from the pump remains constant.

With further reference to FIG. 4, the travel mode can be understood. When the throttle lever 54 is left in the idle T position, the two position solenoid [AA] does not shift. Therefore, charge pressure is routed to the phase control [Y]. The phase control is sensitive to command signal pressure lower than charge pressure. As a result, charge pressure is enough to saturate the control and force the motor to minimum displacement.

Since hydrostatic components use oil to transmit power, the pressure on the oil when multiplied by the displacement of the pump or motor results in a torque value. When using a motor, that torque is the output torque available to do work. The motors in the travel mode are commanded to minimum displacement. At that condition, the motors may be unable to move the machine as the pump is stroked and system pressure rises to its maximum value. At a predetermined pressure the motors override the command to stay at minimum displacement and begin changing their displacement from minimum toward maximum. This ability to seek another displacement is called pressure compensation [W]. With increased motor displacement, the vehicle is able to generate the torque needed to move the vehicle. As the pressure required to move the machine drops off, the motor will move toward minimum displacement for higher speed vehicle travel.

When the operator decides to stop, the accelerator pedal is released. As engine speed drops, the control system will move the pump toward zero displacement (neutral) proportional to the engine speed reduction. In the event that engine speed increases due to the hydrostatic braking, the pump stroke will increase, allowing the vehicle to coast. Service brakes will need to be applied in order to stop.

If the engine is able to absorb the energy that the motors transmit during braking, the engine speed will not increase, but system pressure will. This hydrostatic braking pressure could reach the pressure compensator value and the motors would want to move to maximum displacement, resulting in severe and abnormal dynamic braking. To prevent severe braking, a brake defeat valve [Z] of FIG. 4 (see element 46 in FIG. 8) is used on the motor controls. This valve prevents the motor from pressure compensating in a braking condition and potentially causing operator injury and vehicle damage.

As mentioned previously, closed loop hydrostatic systems are capable of building pressure on either side of the loop. These pressures might be the result of either forward or reverse travel or they could result from accelerating or decelerating. The brake defeat valve [Z] (FIG. 4) must prevent pressure compensation during deceleration in either forward or reverse. The forward and reverse logic needed for this task is provided by two pilot lines (best shown in FIG. 2) running from the EDC 40 to each motor. The differential pressures at the EDC 40 on the pump reverse when the direction of travel shifts the brake defeat valve [Z] dependent upon the direction of vehicle travel.

DESCRIPTION OF THE OPERATION OF THE INVENTION

The operator will interface with the four components of the control system that are located in the operator's stations 48A or 48B (FIG. 1A). As a prerequisite, station selector switch 50 is shifted by the operator toward the command station from which control of the vehicle is desired. Thus, switch 50 makes operative the operator controls in the selected station so that the vehicle control system is responsive to them. If the FNR switch is in the neutral position 65 and the throttle handle 54 is in the idle position, the operator may start the engine, if not; the engine will not start. When the engine starts, the vehicle is in the travel mode, meaning that foot pedal 52A or 52B is commanding engine speed. Therefore, engine speed will respond to the operator in the same way that truck engine responds when the operator presses on the accelerator pedal.

Up to this point, the engine 20 is running, but it has not begun to propel itself. As long as the FNR selector 63 of the selected station, remains in neutral position 65, the operator may select between operation modes (work or travel) by moving throttle lever 54. If the FNR switch 63 has been moved to either the forward or reverse positions 64 or 66 and the operator wishes to change modes, the change will not be allowed until the FNR is returned to the neutral position 65. At the time that the FNR switch is in the neutral position, a mode change will be accepted by the control system. This shift logic is required due to the drastic differences in vehicle performance characteristics in the two different modes, and these could cause unsafe vehicle operaton if mode changes were allowed at any time.

The work mode is selected by the operator when the throttle lever 54 is moved from the idle position to command any other desired engine speed. (At this point, the operator should choose the direction of travel using the FNR switch 3). In this condition, the control system attempts to hold engine speed constant and propel speeds are varied by the operator pressing on the foot pedal (52A or 52B). The foot pedal travel is then translated into an electrical signal and the control system interprets that signal and changes the pump and motor displacements accordingly. The operator is able to choose a particular speed and maintain it very closely in this mode.

If the operator decides to slow down or stop the vehicle, the hydrostatic circuit is able to stop the machine with the same precise control that was available during the propel operation.

When the throttle lever 54 has been left in the idle position, the control system is in the travel mode. At this point, the foot pedal in the selected command station is in control of engine speed and the MV has been shifted to minimum displacement. As the operator increases the pressure on the pedal, engine speed will increase. The control system senses the increase in engine speed and reacts by increasing pump displacement. The variable motors are at minimum angle so that each increment of pump displacement results in turning the motors faster than in the work mode. Operator perception of this type of control is much the same as the smooth acceleration felt while driving a car with an automatic transmission. Furthermore, it results in a combination of higher transport speed at a lower engine speed as compared to the work mode.

If the operator decides to release the foot pedal, the vehicle gradually rolls to a stop. The strong hydrostatic braking that would be expected in the work mode is not present in the travel mode. As previously indicated, service brakes are required on a vehicle with this transmission configuration.

Figure 7:
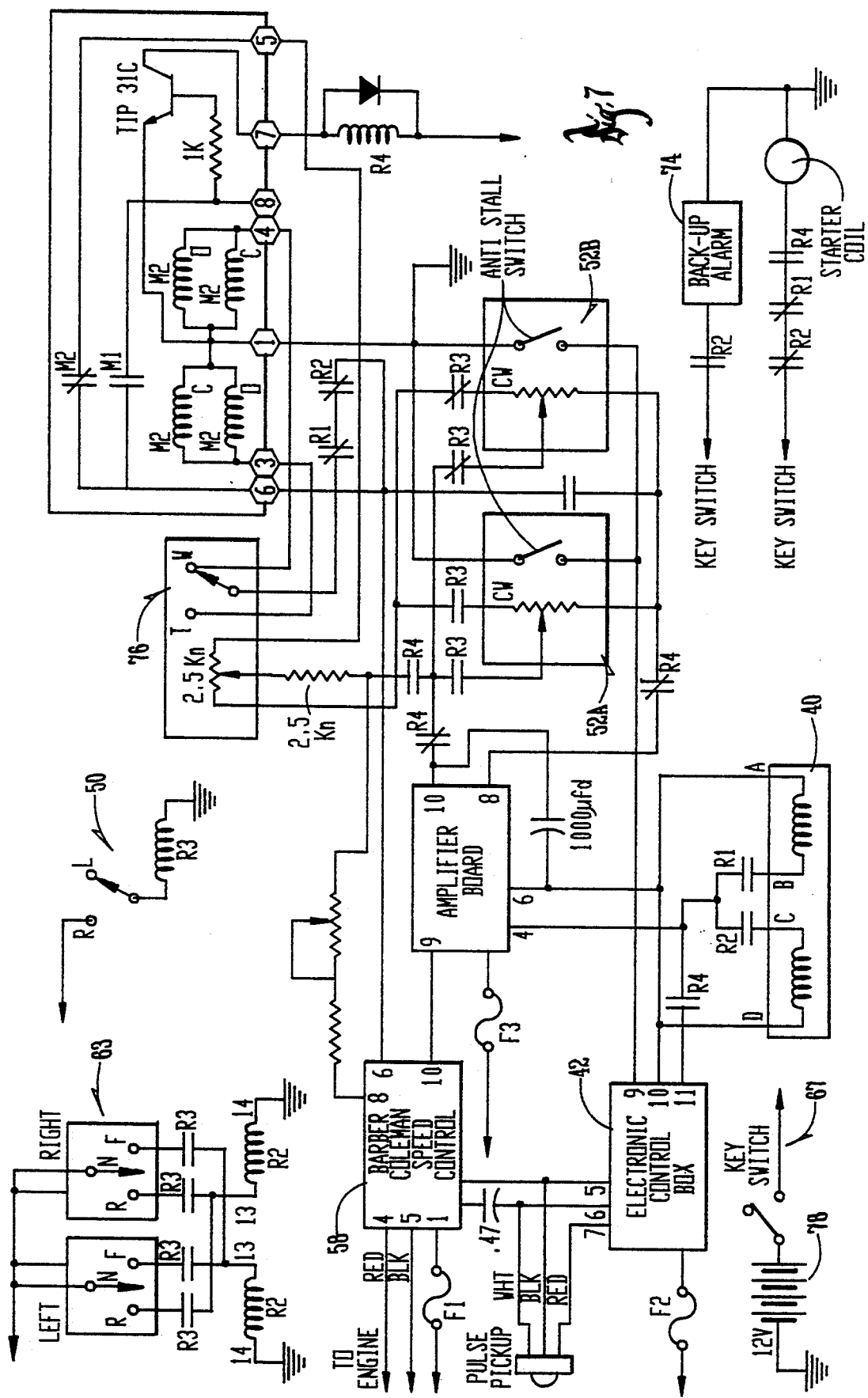
FIG. 7 is a view of the electrical control schematic.

One additional feature that this invention offers is the anti-stall circuit shown in FIG. 7. Often times an operator will want to travel up a hill faster than the available engine power will allow. Instead of stalling the engine, the operator can push the foot pedal down to the floor and the control system will limit pump displacement in order to limit power demand. In this condition, the control system senses a drop in engine speed and reacts by reducing the pump displacement. Vehicle travel speed is reduced to a point where the available engine horsepower is able to propel the vehicle.

The versatility of the dual mode transmission control of this invention allows machine designers the ability to take advantage of features from two different types of transmission controls by using them together. The operator can either set engine speed and vary the displacement of the pump or choose to vary the engine speed and move rapidly from one location to another at a low engine speed.

It is therefore seen that this invention will achieve all of its stated objectives.

We claim:

1. A wheeled vehicle having a hydrostatic drive mechanism, and working components normally operated while said vehicle is moving, comprising:
   a vehicle chassis;
   travel wheel units secured to and supporting said vehicle;
   an engine on said chassis for supplying rotary power to said travel wheel units;
   a control compartment on said chassis;
   a single hydrostatic transmission on said chassis operatively connected to said engine and said travel wheel units;
   said transmission having a variable displacement hydraulic pump and at least one variable displacement motor;
   electronic and hydraulic control means accessible in said control compartment and connected to said hydrostatic transmission to control said hydrostatic transmission to coordinate the operation of said engine and said travel wheel units;
   said electronic and hydraulic control means being operatively connected to said pump and said variable motor;
   said electronic and hydraulic control means having a travel mode wherein the displacements of said pump and said variable motor are responsive to the speed of said engine and a work mode wherein the displacements of said pump and said variable motor are independent of the speed of said engine, with control components to coordinate said modes and to permit separate operation of said modes; and
   said electronic and hydraulic control means includes a means for phasing the displacements of said variable displacement pump and said variable displacement motor in said hydrostatic transmission to achieve higher vehicle speeds comprising a means connected to said electronic and hydraulic control means for communicating a displacement command signal to said pump and proportionately to said variable motor; a phase control means operatively connected to said variable motor and responsive to said displacement command signal to decrease the displacement of said variable motor when said displacement command signal to said pump reaches a predetermined level.

2. The vehicle of claim 1 wherein said electronic and hydraulic control means includes a pickup means operably connected to said engine for generating a control signal representative of the speed of said engine; said electronic and hydraulic control means being responsive to said signal and in response thereto changing the displacement of said pump and said variable motor in said travel mode.

3. The vehicle of claim 1 wherein said control compartment has two equivalently equipped laterally positioned operator command stations and a station selector switch operatively and alternately connecting one of said two command stations at a time to said electronic and hydraulic control means so that said vehicle is operable from only one of said command stations at a given time.

4. The vehicle of claim 1 wherein said work components are street sweeping components.

5. The vehicle of claim 1 wherein said electronic and hydraulic control means include electromechanical switching means for preventing a change between said travel and work modes unless said hydrostatic transmission is in a neutral position.

6. The vehicle of claim 1 wherein said pump supplies a volume of hydraulic fluid under pressure to said motor for driving said travel wheel units and said control means is operatively connected to a dual purpose accelerator pedal in said control compartment and said engine to alternately affect the speed of said engine in said travel mode or to vary the volume of hydraulic fluid pumped by said variable displacement pump in the work mode.

7. The vehicle of claim 6 wherein said control means is operatively connected to a dual purpose throttle lever in said control compartment and said engine to affect engine speed and whose position serves to select said travel and work mode of operation.

8. The vehicle of claim 1 wherein said control means is operatively connected to a dual purpose throttle lever in said control compartment and said engine to affect engine speed and whose position serves to select said travel and work modes of operation.

9. The vehicle of claim 1 wherein said hydrostatic transmission includes at least two hydraulic lines between said pump and motor such that loads on said motor result in fluid pressure on said lines and a pressure compensating control to increase the displacement of said motor to reduce system pressure, when the differential pressure between the two said lines of said transmission reaches a predetermined level.

10. A wheeled vehicle having a hydrostatic drive mechanism, and working components normally operated while said vehicle is moving, comprising,
a vehicle chassis,
travel wheel units secured to and supporting said vehicle, an engine on said chassis for supplying rotary power to said travel wheel units,
a control compartment on said chassis,
auxiliary work components on said chassis,
a single hydrostatic transmission on said chassis operatively connected to said engine and said travel wheel units, said transmission having a variable displacement hydraulic pump and at least one variable displacement hydraulic motor,
electronic and hydraulic control means accessible in said control compartment and connected to said hydrostatic transmission to provide a control signal to said hydrostatic transmission to coordinate the operation of said engine and said travel wheel units,
said electronic and hydraulic control means having a travel mode wherein the output of said hydrostatic transmission is responsive to the speed of said engine and a work mode wherein the output of said hydrostatic transmission is independent of the speed of said engine with control components to coordinate said modes and to permit the separate operation of said modes,
said electronic and hydraulic control means includes valve means for defeating braking operably connected to said motor to defeat abnormal hydrostatic braking of said vehicle when in said travel mode and wherein said electronic and hydraulic control means includes an antistall means responsive to a sudden uncommanded drop in the speed of said engine for preventing said transmission from demanding more power than said engine is capable of providing; said antistall means comprising a governor for controlling the speed of said engine operatively connected to said engine, said transmission, and to an operator demand signal generating means in said control compartment of said vehicle, a pickup means for generating a signal indicative of actual engine speed operatively connected to said engine, and an antistall switch connected between said governor means and said pickup means and said operator demand means such that whenever actual engine speed suddenly drops below demanded speed said antistall switch temporarily alters said control signal to said transmission; and thereby adjusts the output of said transmission to a level commensurate with available actual power so that the operator is prevented from stalling said engine.

* * * * *